INVENTOR.
RALPH H. JOHNSON

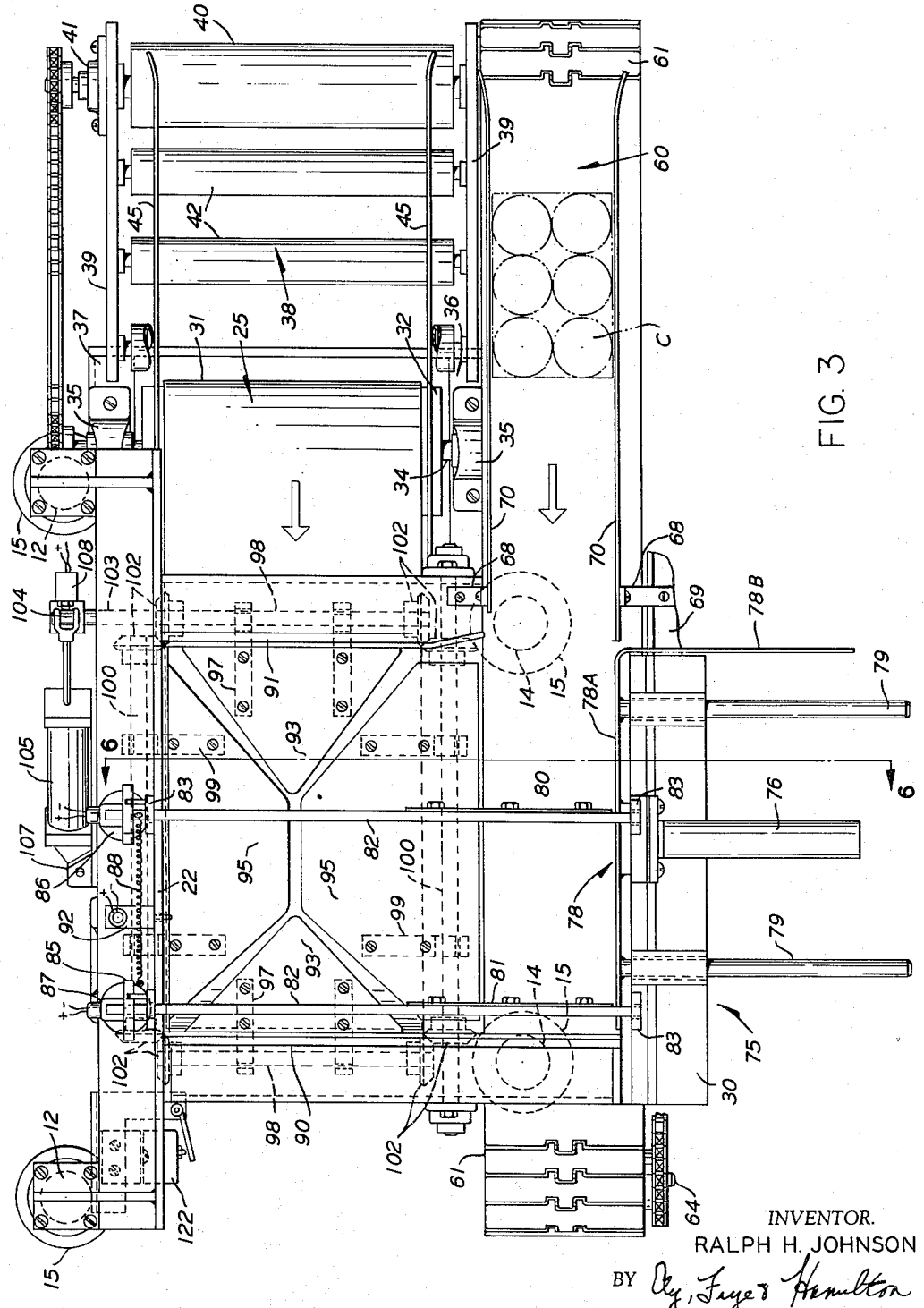

INVENTOR.
RALPH H. JOHNSON

ATTORNEYS.

Aug. 29, 1961    R. H. JOHNSON    2,997,829
APPARATUS FOR LOADING CONTAINERS
Filed July 11, 1957    5 Sheets-Sheet 5

INVENTOR.
RALPH H. JOHNSON
BY
ATTORNEYS.

United States Patent Office 2,997,829
Patented Aug. 29, 1961

2,997,829
APPARATUS FOR LOADING CONTAINERS
Ralph H. Johnson, Stow, Ohio, assignor to The Quaker Oats Company, Chicago, Ill., a corporation of New Jersey
Filed July 11, 1957, Ser. No. 671,332
5 Claims. (Cl. 53—62)

The present invention relates generally to improvements in apparatus for loading and packing containers. More particularly, the invention relates to apparatus for loading cans or containers of food and the like into suitable shipping boxes, the containers preferably being previously held in "six-pack" cartons.

Apparatus according to the invention performs in automatic sequence several operations which heretofore were satisfactorily performed only manually. The apparatus receives the empty shipping boxes and the containers or six-pack cartons for packing therein, positions the boxes in relation to the containers or cartons, arranges the correct number of containers or cartons required to form a layer of containers in the box, loads the containers or cartons or a combination thereof into the box, and conveys the filled box to suitable box sealing apparatus. The several operations are performed automatically in a predetermined sequence in an efficient manner and at a high rate of speed which was heretofore not thought to be practicable.

Accordingly, it is an object of the present invention to provide improved apparatus for loading and packing containers into shipping boxes.

Still further, it is an object to provide apparatus which will perform in predetermined automatic sequence the several operations necessary to load and pack containers or six-pack cartons or a combination thereof into shipping boxes.

These and other objects, as well as the advantages, of the invention will be apparent in view of the following description and the attached drawings, in which a preferred form of apparatus according to the invention is indicated generally by the numeral 10.

In the drawings:

FIG. 3 is a top view of the apparatus;

General description and frame

Figure 1:
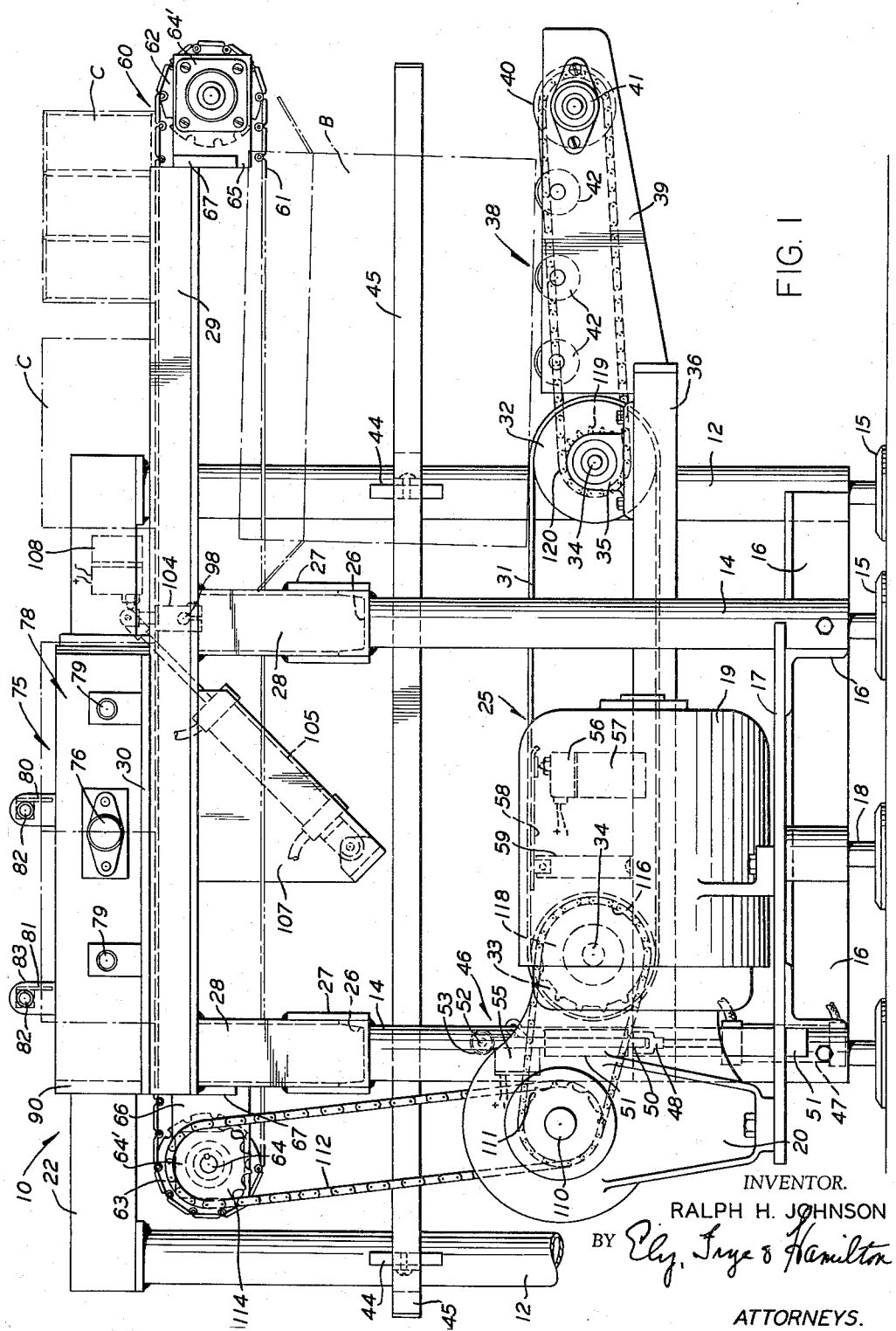
FIG. 1 is a side view of a can loading apparatus according to the invention.

The structural frame of the apparatus 10 includes a pair of widely spaced vertical support posts 12 on one side and a second pair of narrower spaced support posts 14 on the opposite side. Each of the support posts 12 and 14 has a suitable base plate 15 for resting on the foundation.

Attached near the lower end of each support post 12 and 14 is a generally rectangular horizontal frame 16 of welded angle iron construction. The frame 16 extends to one side beyond the posts 14 and supports a bed plate 17 on which is mounted a conventional AC drive motor 19 and an integral gear reduction unit 20. An auxiliary support post 18 is placed beneath the bed plate 17.

Supported on and extending between the upper ends of each post 12 is a cap plate 22 of angle iron and web plate construction. In addition to strengthening the frame, the cap plate 22 provides a mounting for several elements of the apparatus, as described below. Beneath the plate 22 is attached an additional angle iron 23 providing a mounting for certain other elements of the apparatus 10.

Figure 6:
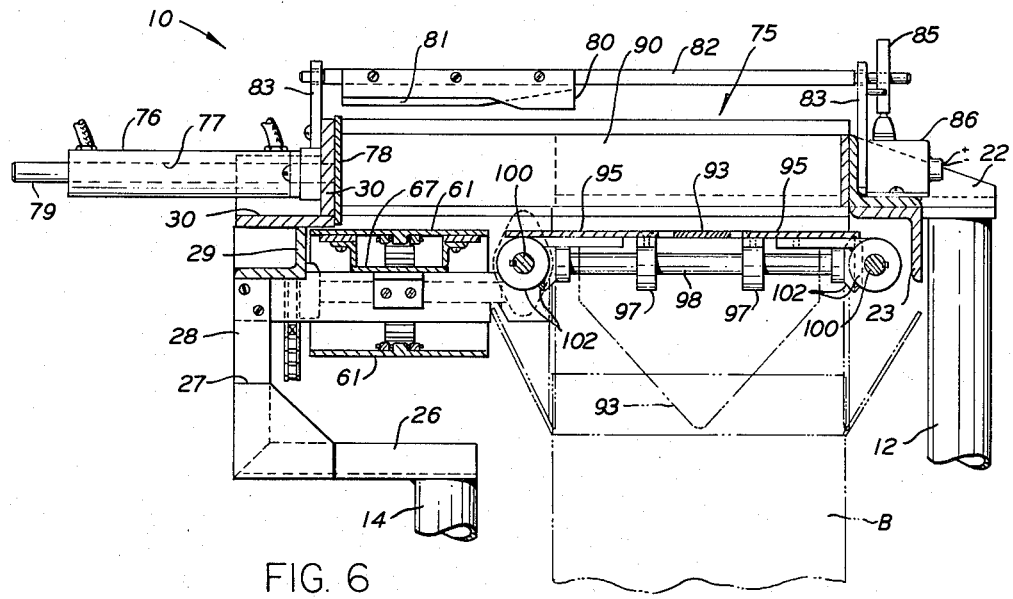
FIG. 6 is a view in section taken substantially on line 6—6 of FIG. 3.

The posts 12 and 14 are spaced apart transversely a sufficient distance to accommodate the box conveyor, indicated generally at 25 and described below. However, above the conveyor 25 the frame of the apparatus 10 is widened by frame members supported on and extending between the upper ends of the posts 14 and extending laterally above the motor 19 and reducer 20. This part of the frame includes a pair of horizontal transverse channels 26, reinforcing web plates 27 and vertical channels 28. As best seen in FIG. 6, supported on the upper ends of members 28 is an angle iron 29 supporting a cap plate 30. The cap plate 30 provides a mounting for certain elements of the apparatus 10, as described below.

The box conveyor

The box conveyor 25 includes a conventional endless belt 31, preferably of rubber and fabric construction, carried between an entry roller 32 and an exit roller 33, and extending longitudinally between the posts 12 and 14. Each of the rollers is provided with a drive shaft extension 34 and is journaled in suitable pillow blocks 35. On the drive side, the blocks 35 are mounted on an angle iron bracket 36 attached to the inside of posts 14. On the opposite side, the blocks 35 are mounted on a similar bracket 37 attached to the inside of posts 12.

The brackets 36 and 37 extend outwardy of the entry roller 32 and support a box feed conveyor assembly indicated generally at 38. The conveyor 38 includes side plates 39, a driven friction surface roller 40 journaled in bearings 41, driven preferably from drive shaft 34 of entry roller 32, and several idler rollers 42. As shown, the conveyor 38 is relatively short. In actual operation of the apparatus 10, it may be a separate unit located ahead of the apparatus 10 but in any event, should be of sufficient length to provide an adequate and continuous supply of empty shipping boxes to the box conveyor per se, indicated at 25.

Figure 2:
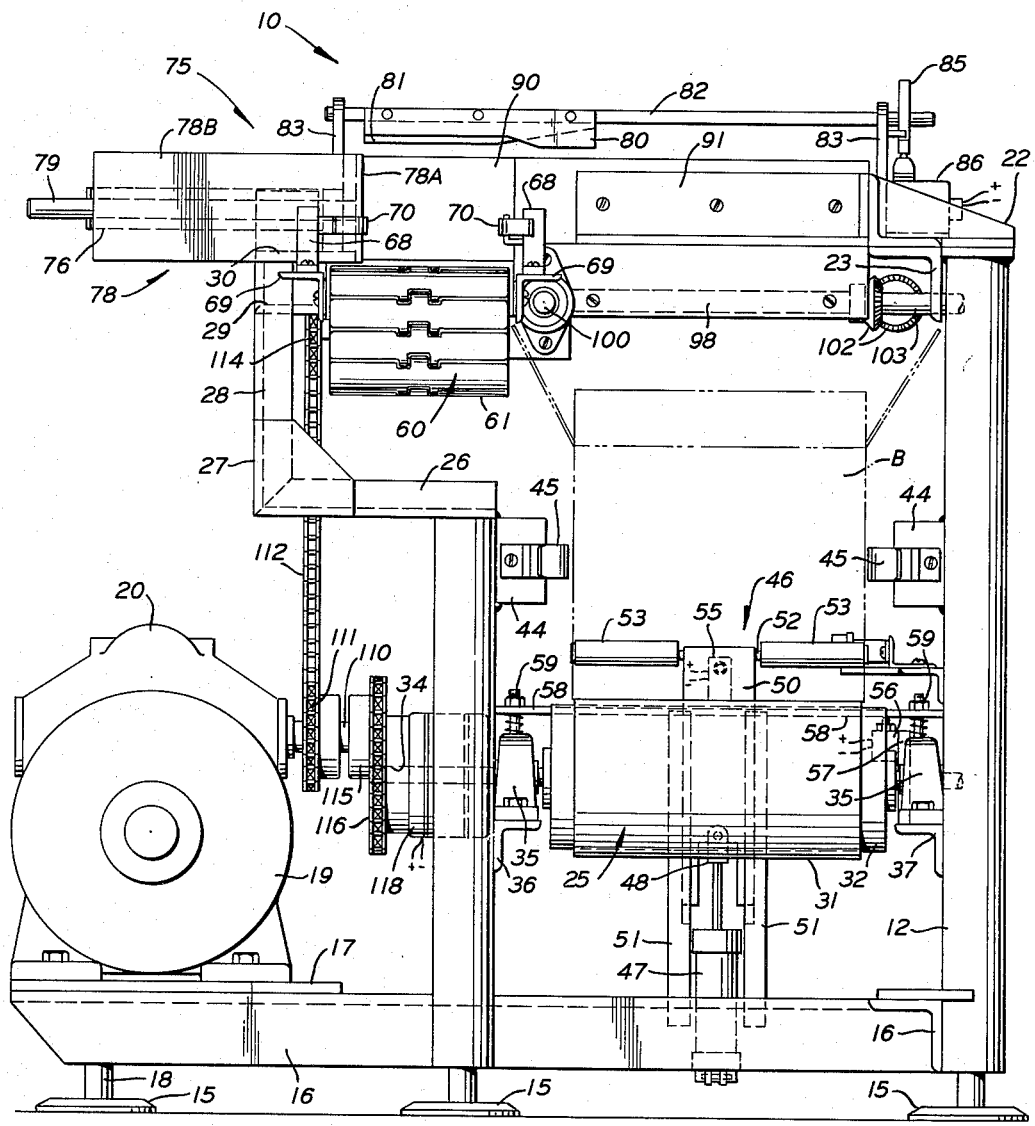
FIG. 2 is a view, taken from the entry end, of the apparatus.

As the empty shipping boxes (shown in chain lines and indicated at B in FIGS. 1, 2 and 6) are delivered by the feed conveyor 38 to the conveyor 25, suitable guide means are employed to laterally position the boxes B on the belt 31. As shown, the guide means includes mounting brackets 44 attached to the inside of each support post 12 and 14. Each pair of brackets 44 supports a long narrow guide bar 45.

The boxes B are positioned laterally on the belt 31 by the guide bars 45. The boxes are positioned longitudinally on the belt by a retractible stop assembly indicated generally at 46 located behind the exit roller 33. The assembly 46 includes a cylinder 47 mounted vertically on the frame 16. The extensible cylinder shaft is fitted with a clevis 48 attached to the underside of a slide plate 50. The plate 50 is supported in a vertical position by a pair of grooved guide bars 51 mounted on the frame 16 one on either side of the cylinder 47. Extending horizontally through the upper end of the plate 50 is a shaft 52 on either end of which is mounted a small idler roller 53.

The stop assembly 46 also includes a limit switch 55 carried on the slide plate 50 and so located as to be actuated when a box B comes in contact with the stop. A second limit switch 56 is carried on a mounting fixture 57 attached to the bracket 37 approximately midway of the belt 31. Switch 56 is actuated by a switch plate 58, in contact with the under surface of the upper run of the belt 31. The plate 58 is yieldably supported by a pair of compression spring loaded mounting fixtures 59, one attached to each of the brackets 36 and 37, so as to actuate the switch 56 when a box B has been filled with the desired quantity of containers or cartons (indicated at C in FIGS. 1, 3, 4 and 5).

*The container conveyor*

The container conveyor indicated generally at 60 includes a longitudinal endless belt 61, preferably of conventional metal link construction, carried between an entry roller 62 and an exit roller 63. The exit roller is provided with a drive shaft extension 64. Both rollers are journaled in suitable bearings 64'. The entry pair of bearings are mounted on side plates 65. The exit pair of bearings are mounted on similar side plates 66. The side plates 65 and 66 extend longitudinally of a conveyor support unit 67 attached to the frame member 29.

As the containers C are delivered by suitable additional conveyors (not shown) to the container conveyor 60 suitable guide means are employed to laterally position the containers on the belt 61. As shown, the guide means includes mounting brackets 68 carried by auxiliary frame members 69 attached to the conveyor support unit 67. The brackets 68 support long narrow guide bars 70.

*Container pusher and loader*

When the containers C are delivered by the belt 61 to the end of the box conveyor 60, they are pushed from the belt and loaded into a box B by a combination of apparatus elements indicated generally by the numeral 75.

The pusher components of the assembly 75 include a pneumatic cylinder 76 mounted on the cap plate 30. The shaft 77 of the cylinder is extensible transversely above the exit portion of the belt 61. Attached to the end of the shaft 77 is a pusher plate having a portion 78A parallel with the belt 61 and a portion 78B transverse of the belt. The plate 78 is stabilized by a pair of attached guide rods 79 extending through brackets on the cap plate 30.

As described in detail below, where reference is made to FIGS. 4a–d, at least two six-pack cartons (or 12 containers) should be delivered by the conveyor 60 before the cylinder 76 is actuated to extend the pusher plate 78. The completion of such delivery is signalled by a first and second flag, indicated at 80 and 81. Each flag is mounted on a shaft 82 rotatably suspended in suitable brackets 83, and extends transversely of the conveyor 60. Above the cap plate 22, the end of each shaft 82 is fitted with a cam 85 for actuating a first and second limit switch, indicated at 86 and 87. A tension spring 88 is connected to opposite sides of the shafts 82 so that the flags 80 and 81 will return to a vertical position after passage of containers C.

Extending across the upper rear portion of the apparatus, between the drive side cap plate 30 and the opposite cap plate 22, is a rear wall plate 90. Parallel to the plate 90, and extending to a point above the front post 14, is a front wall plate 91. As best shown in FIG. 3, the plates 90, 22 and 91 define a surface area, approximately or substantially equal to the area of a box B and open at one side, into which containers C are discharged from the belt 61 by the pusher plate 78. A limit switch 92 extends through the plate 22 and is actuated when a container C comes into contact with the plate 22.

The floor of the area defined by the edge of belt 61, and the walls 90, 22 and 91, includes four interfitting false bottom sections hinged along their marginal edges for opening simultaneously. The front and rear sections are indicated at 93, the two side sections are indicated at 95. Each bottom section 93 is rigidly connected by strap hangers 97 to a gear shaft 98. Each bottom section 95 is rigidly connected by hangers 99 to a gear shaft 100. At either end of each shaft 98 and 100 is a bevel pinion gear 102. Each gear 102, totaling eight in all, intermeshes with the adjacent gear 102 and thus rotation of one gear shaft will simultaneously rotate all the shafts.

A preferred means to effect such rotation is to provide a gear shaft 98 with a shaft extension 103 journaled in the frame plate 23. A block and offset clevis 104 affixed to the shaft 103 is pivotally connected to the extensible shaft of a pneumatic cylinder 105. The cylinder 105 is mounted on a support plate 107 depending from the outside of the cap plate 22. When the cylinder 105 is actuated to extend the cylinder shaft, a limit switch 108 is actuated.

*Conveyor drive*

The conveyors 25 and 60 are driven from the output shaft 110 of the gear reduction unit 20. Mounted on the shaft 110 is a first pulley sprocket 111 driving a chain 112 and a sprocket 114 on the shaft extension 64 on the exit roller 63 of the container conveyor. Outboard of sprocket 111, a second sprocket 115 is mounted on shaft 110. The sprocket 115 drives a chain 116 and the input side of a normally energized magnetic clutch unit 118. When the clutch unit 118 is engaged, the shaft extension 34 of the exit roller 33 of the conveyor 25 is driven so as to rotate the belt 31. When the belt 31 is rotating, a sprocket 119 on the shaft extension 34 of the entry roller 32 drives a chain 120 and the friction roller 40 of the feed conveyor 38.

*Operation*

Figure 7:
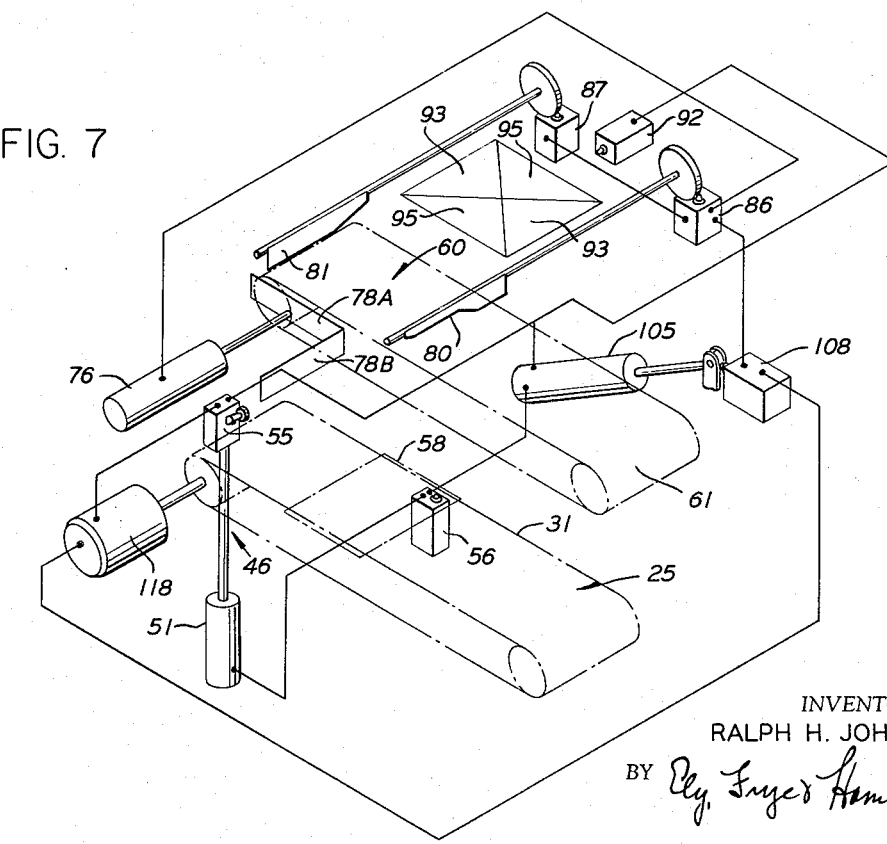
FIG. 7 is a diagrammatic view showing the operative relation of the several limit switches and cylinders employed in one form of the apparatus.

Referring generally to FIG. 7, the apparatus 10 employs three cylinders; the stop assembly cylinder 47; the pusher plate cylinder 76; and the bottom drop cylinder 105. These cylinders may be either air or hydraulic operated. Each of the cylinders is also equipped with a suitable actuating mechanism such as an electrical solenoid (not shown). The solenoids controlling each cylinder are energized by the various remotely located limit switches as follows:

At the beginning of a container loading cycle, the motor 19 is running, the clutch 118 is engaged, the conveyor 25 is supplying a succession of empty boxes B, the stop assembly 46 is raised and the conveyor 60 is supplying a succession of containers C.

When a box B has been delivered by the belt 31 to a position in contact with the raised stop assembly 46, the normally open limit switch 55 is closed. Energization of switch 55 de-energizes the magnetic clutch 118, stopping rotation of the belt 31, the box B now being in position for loading (see FIG. 2).

Figure 4A:
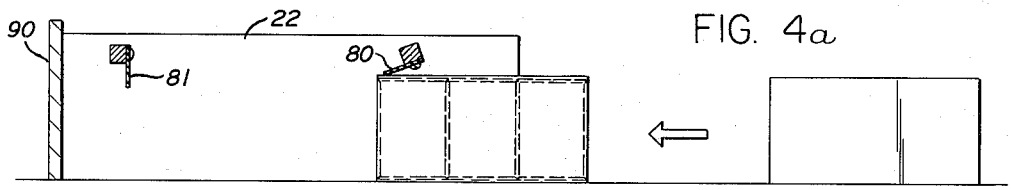
FIGS. 4a to 4d are schematic side views showing the delivery and arrangement of containers in six-pack cartons in preparation for loading.
Figure 4B:
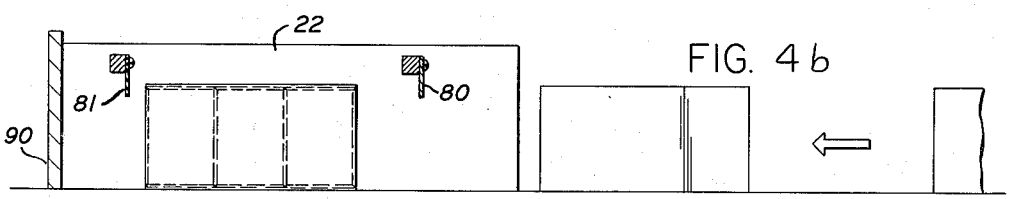
Figure 4C:
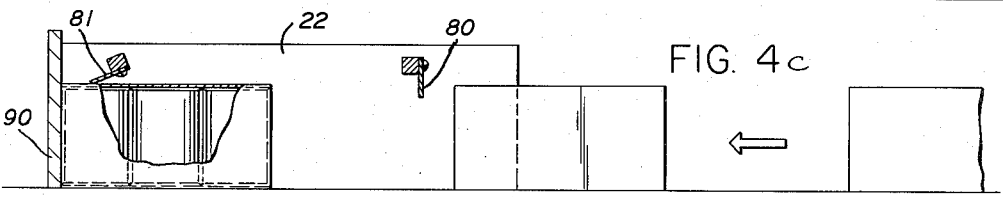

During the same interval, containers C have been delivered by the conveyor 60. Referring also to FIGS. 4a, b and c, a single container C will successively trip first flag 80 and then flag 81. This successively closes the normally open limit switches 86 and 87. Unless both limit switches are closed the pusher plate cylinder 76 will not be extended. This condition occurs (see FIG. 4d) when two six-pack cartons (or 12 containers) have been delivered by the belt 61. However, as described below, so long as switch 87 is closed, the cylinder 76 will not retract.

Figure 4D:
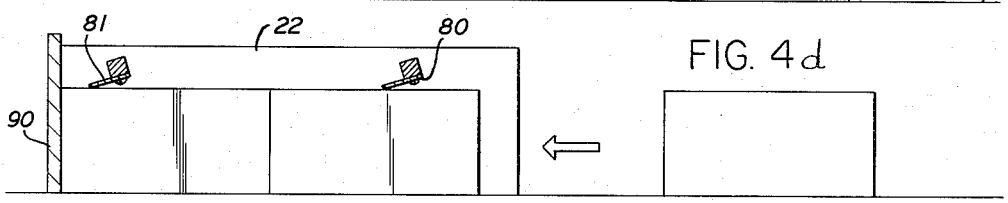
Figure 5A:
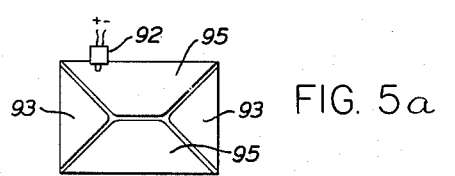
FIGS. 5a to 5d are schematic plan views showing the transfer of six-pack cartons onto a false bottom.
Figure 5B:
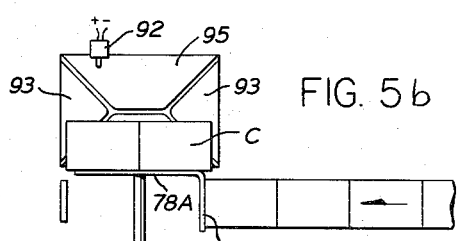

The position of the container C corresponds in FIGS. 4d and 5a. When the switches 86 and 87 are both closed, the cylinder 76 is energized as shown in FIG. 5b. The length of the stroke of cylinder 76 is such that the containers C are pushed from the belt 61 onto the false bottom sections (93 and 95) but not all the way across. Portion 78B extends across belt 61 and blocks the delivery of additional containers C during this stage of the operation.

Figure 5C:
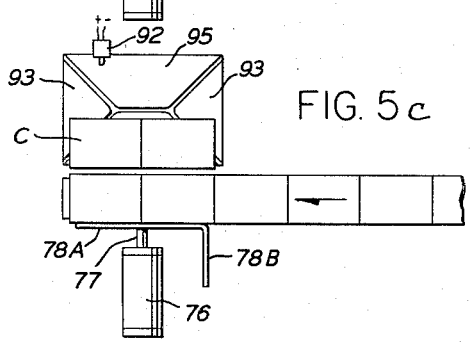
Figure 5D:
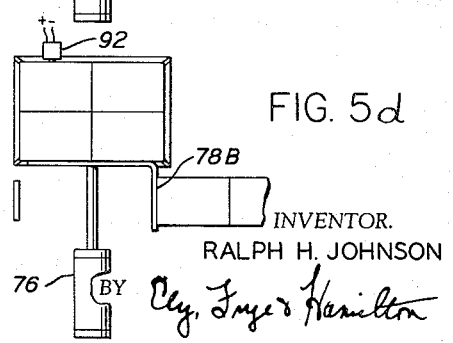

After the containers C have been pushed from belt 61, the flags 80 and 81, biased by spring 88, return to the upright position which opens the switches 86 and 87 causing the cylinder 76 to retract. As shown in FIG. 5c, two more six-pack cartons (or 12 containers) are delivered and the pushing operation is repeated. As shown in FIG. 5d, the next pushing operation fills the false bottom section, the cylinder 76 remains momentarily extended with the pusher plate portion 78A, forming the fourth side of the false bottom surface area, and the normally open limit switch 92 is closed.

As described above, switch 55 is closed when a box B is in position for loading. When both switches 55 and 92 are closed, the bottom drop cylinder 105 will be actuated and the false bottom section will be opened (see FIG. 6) loading the containers C into the box B. As the false bottom sections 93 and 95 open, the lid flaps of a box B (shown in chain lines in FIG. 6) will be maintained in an outwardly bent position or at least vertically upright and so the lid flaps will not interfere with dropping of containers C into the box. Opening of the false bottom also clears the flag 81, opening switch 87 and retracting the push cylinder 76.

As described above, beneath belt 31 there is a yieldingly supported plate 58 which closes the normally open limit switch 56. The strength of the compression loading of the plate support fixtures 59 determines the number of containers C loaded into each box B. Thus, if only one layer of containers is to be loaded, the strength of the fixtures 59 is so chosen as to be less than the weight of one layer of containers. If two layers are to be loaded, the strength of fixtures 59 is greater than the weight of one layer of containers.

In any event, the closing of switch 56 actuates cylinder 47 to lower the stop assembly 46 below the surface of belt 31 and actuates the drop cylinder 105 to raise the false bottom sections 93 and 95.

The normally open limit switch 108 is closed when the cylinder 105 is extended. Switch 108 is in the circuit of switches 86 and 87 and will prevent actuation of the pusher plate cylinder 76 while the bottom sections 93 and 95 are dropped. When the cylinder 105 is retracted to raise the bottom sections 93 and 95, the switch 108 will clear the circuit of switches 86 and 87 so that the pushing operations can resume. Opening of switch 108 also energizes clutch 118 starting the belt 31 to remove the filled box B and deliver an empty box.

After a momentary delay, cylinder 47 is actuated so as to raise the stop assembly 46. This may be accomplished by a timer if desired. Or, referring to FIG. 3, a limit switch 122 mounted on the rear post 12 and actuated by a hinged plate 123 could be employed. Switch 122 is normally open and when closed by the passage of a filled box B, will actuate cylinder 47 raising the stop assembly 46.

The particular electrical elements described above are illustrative only. Other suitable means, including photoelectric beams, could also be employed, so long as operation of the several mechanical elements will take place in the desired sequence. It is further to be understood that the wiring connections, particularly in FIG. 7, are schematic and illustrative only and are deemed to be within the understanding of one skilled in the electrical arts.

Mechanical modifications of the apparatus may also suggest themselves. Therefore, the scope of the invention should not be limited to the form of apparatus 10 shown in the drawings but only by the scope of the claims.

What is claimed is:

1. Box loading apparatus comprising, a frame, a first conveyor for delivery of an empty box, means adjacent said first conveyor for positioning a longitudinally moving box at a predetermined location thereon and stopping said conveyor when said box is at said predetermined location, a second conveyor above and offset of said first conveyor for delivery of smaller containers for loading in a box, a false bottom portion beside said second container and above said predetermined location with respect to said first conveyor, means to transfer containers laterally from the second conveyor onto said false bottom portion, means to drop said false bottom portion when the area occupied by the containers is substantially the same as the area of the box, a yieldingly mounted plate positioned beneath said first conveyor in said predetermined location, and means associated with said plate and actuated thereby when a predetermined quantity of containers have been loaded in a box to start said first conveyor.

2. In apparatus for loading boxes, said apparatus having a first conveyor for the delivery of empty boxes, a means for positioning an empty box at a predetermined location on the conveyor, and switch means for stopping the conveyor with a box positioned at said predetermined location thereon, the combination of a second conveyor parallel to, above the offset of said first conveyor for delivery of smaller containers for loading in a box, a false bottom portion beside said second container and above said predetermined location on said first conveyor, means to transfer containers laterally from the second conveyor onto said false bottom portion, means to drop said false bottom portion when the area occupied by the containers is substantially the same as the area of the box, a yieldingly mounted plate positioned beneath said first conveyor in said predetermined location, and means associated with said plate and actuated thereby when a predetermined quantity of containers has been loaded in a box to start said first conveyor.

3. In apparatus for loading boxes, said apparatus having a first conveyor for the delivery of empty boxes, a means for positioning at a predetermined location on the conveyor an empty box moving longitudinally thereon, and switch means for stopping the conveyor with a box positioned thereon, the combination of a second conveyor parallel to, above and laterally offset of said first conveyor for delivery of smaller containers for loading a box, a false bottom portion beside said second conveyor above said predetermined location on the first conveyor and having a surface area substantially equal to the area of a box, extensible pusher means to transfer containers laterally from the second conveyor onto said false bottom portion, first switch means for detecting delivery by said second conveyor of a quantity of containers occupying an area approximately equal to one-half the area of said false bottom portion and alternately extending and retracting said pusher means, and second switch means to drop said false bottom portion when the surface thereof is substantially covered by containers.

4. Box loading apparatus comprising, a frame, a first conveyor on said frame for delivery of a series of empty boxes, retractible stop means on said frame, means connecting said retractible stop means with said first conveyor to stop said conveyor with the leading box positioned longitudinally on said conveyor, guide means on said frame for positioning the leading box laterally on said conveyor, a second conveyor above and to one side of said first conveyor for delivery of a series of smaller containers for loading into boxes, a false bottom portion beside said second conveyor and above the leading box on said first conveyor when said box is longitudinally and laterally positioned, means to transfer a plurality of containers from the second conveyor onto said false bottom portion and means to open said false bottom portion and drop said containers into said box when the area occupied by the containers is substantially the same as the area of the box.

5. In apparatus for loading boxes, said apparatus having a delivery conveyor supplying a series of empty boxes, the combination of a first conveyor on said frame for carrying said boxes from said delivery conveyor single file into the interior of said apparatus, retractible stop means on said frame medially of said first conveyor, means connecting said retractible stop means with said first conveyor to stop said conveyor with the leading box positioned longitudinally on said first conveyor, guide means to position the leading box laterally on said first conveyor, a second conveyor above and to one side of said first conveyor for delivery of a series of smaller containers for loading into boxes, a false bottom portion beside said second conveyor and above the leading box when longitudinally and laterally positioned on said first conveyor, means to transfer a predetermined number of containers from the second conveyor onto said false bottom portion, and means to open said false bottom portion when the area occupied by the containers is substantially the same as the area of the box.

References Cited in the file of this patent

UNITED STATES PATENTS

| | | |
|---|---|---|
| 660,086 | Camp | Oct. 16, 1900 |
| 1,044,500 | Converse | Nov. 19, 1912 |
| 1,568,082 | Mitton | Jan. 5, 1926 |
| 2,102,640 | Novotny | Dec. 21, 1937 |
| 2,252,127 | Kimball | Aug. 12, 1941 |
| 2,331,018 | Fedorchak et al. | Oct. 5, 1943 |
| 2,594,337 | Noe | Apr. 29, 1952 |
| 2,681,171 | Brown et al. | June 15, 1954 |
| 2,684,799 | Holstein | July 27, 1954 |
| 2,723,606 | Brockardt et al. | Nov. 15, 1955 |
| 2,729,374 | Haycock | Jan. 3, 1956 |
| 2,765,599 | Johnson | Oct. 9, 1956 |
| 2,782,577 | Beall | Feb. 26, 1957 |
| 2,815,623 | Holstebroe et al. | Dec. 10, 1957 |
| 2,819,576 | Hendricks et al. | Jan. 14, 1958 |
| 2,821,822 | Mapes | Feb. 4, 1958 |